United States Patent
Baughman et al.

(10) Patent No.: US 11,146,524 B2
(45) Date of Patent: Oct. 12, 2021

(54) INTELLIGENT CONTEXTUAL TIMELINING OF NOTIFICATIONS

(71) Applicant: International Business Machines Corporation, Armonk, NY (US)

(72) Inventors: Aaron K. Baughman, Cary, NC (US); Shikhar Kwatra, Durham, NC (US); Raghuveer Prasad Nagar, Rajasthan (IN); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 20 days.

(21) Appl. No.: 16/547,269

(22) Filed: Aug. 21, 2019

(65) Prior Publication Data
US 2021/0058357 A1    Feb. 25, 2021

(51) Int. Cl.
| H04L 29/08 | (2006.01) |
| G06F 17/30 | (2006.01) |
| G06F 11/34 | (2006.01) |
| G06F 11/30 | (2006.01) |
| H04L 12/58 | (2006.01) |
| G06F 9/54  | (2006.01) |

(52) U.S. Cl.
CPC ............. H04L 51/24 (2013.01); G06F 9/542 (2013.01)

(58) Field of Classification Search
CPC ................................ H04L 51/24; G06F 9/542
USPC .............................................................. 709/206
See application file for complete search history.

(56) References Cited

U.S. PATENT DOCUMENTS

| 9,131,355 | B2* | 9/2015 | Coleman | H04W 4/21 |
| 9,942,355 | B2* | 4/2018 | Siracusa | H04L 67/14 |
| 10,135,937 | B2* | 11/2018 | Dotan-Cohen | H04L 67/26 |
| 2008/0215415 | A1 | 9/2008 | Willms | |
| 2010/0042470 | A1 | 2/2010 | Chang et al. | |
| 2010/0332315 | A1 | 12/2010 | Kamer et al. | |
| 2011/0087547 | A1* | 4/2011 | Amaro | G06Q 30/02 |
| | | | | 705/14.53 |
| 2014/0006150 | A1 | 1/2014 | Thompson et al. | |
| 2015/0371267 | A1 | 12/2015 | Porat et al. | |
| 2016/0286367 | A1* | 9/2016 | Mashhadi | H04L 67/26 |
| 2016/0360336 | A1* | 12/2016 | Gross | H04M 1/72583 |
| 2018/0077097 | A1 | 3/2018 | Alfaro et al. | |

(Continued)

OTHER PUBLICATIONS

IBM Cloud, Tag-based notification, May 7, 2019.
(Continued)

*Primary Examiner* — Moustafa M Meky
*Assistant Examiner* — Elizabeth Kassa
(74) *Attorney, Agent, or Firm* — Garg Law Firm, PLLC; Rakesh Garg; William Hartwell (57) ABSTRACT

Using a forecasting model, a timeline of future activities is forecasted. Using a constraints analysis model, a set of profile inputs is analyzed to determine a context of a first period in the forecasted timeline. Using a context extraction model, a first notification from a set of notifications is analyzed to determine a context of the first notification. A degree of correspondence is computed between the context of the first period and the context of the first notification. When the degree of correspondence is at least a threshold degree of correspondence, the first notification is scheduled for presentation during the first period regardless of a time of arrival of the first notification.

20 Claims, 7 Drawing Sheets

(56) References Cited

U.S. PATENT DOCUMENTS

| | | | |
|---|---|---|---|
| 2018/0139294 A1* | 5/2018 | Ju | G06Q 50/01 |
| 2018/0139295 A1* | 5/2018 | Ju | G06F 11/3447 |
| 2018/0165708 A1* | 6/2018 | Bajaj | G06Q 30/0277 |
| 2019/0171950 A1* | 6/2019 | Srivastava | G06Q 10/067 |
| 2021/0058357 A1* | 2/2021 | Baughman | H04L 51/24 |

OTHER PUBLICATIONS

IBM, Robotic process automation (RPA), May 7, 2019.
Amazon.Com, Amazon Connect features, May 7, 2019, https://aws.amazon.com/connect/features/.
Knoll, Manage and prioritize all Android notifications on your device, Feb. 3, 2015, https://trendblog.net/manage-prioritize-android-notifications-device/.

* cited by examiner

INTELLIGENT CONTEXTUAL TIMELINING OF NOTIFICATIONS

TECHNICAL FIELD

The present invention relates generally to a method, system, and computer program product for organizing messages sent to a user. More particularly, the present invention relates to a method, system, and computer program product for intelligent contextual timelining of notifications.

BACKGROUND

Within the scope of the illustrative embodiments, a notification comprises information that pertains to a subject of perceived interest to a user, where such information is transmitted to the user over an electronic system associated with the user. Within the scope of the illustrative embodiments, and without being limited thereto, a notification can take the form of email messages, content inserted into another content (e.g., advertisement insertion in a webpage), text message (e.g., short message service (SMS)), audio video or multimedia content presented separately or inserted into other content or data and delivered via an electronic platform (e.g., content inserted into a social media feed of the user, or notifications inserted in streaming content, television programming, and the like). A method of delivery of a notification is also referred to herein as a channel.

Presently, technology exists to determine subjects that are of interest to a user. For example, online shopping websites can determine the goods or services of interest to the user and can configure and transmit notifications related to those goods or services to the user in one or more manners listed herein. Email tools are configurable to separate the emails that are of interest to the user and those that are not (often classified and filed as junk mail), and allow the emails pertaining to the subjects of interest to pass through to the user.

A user is susceptible to notifications constantly, from a variety of sources, almost all hours of the day. In the present day's connected life, so long as the user has some mechanism to receive information of any kind, notifications are likely to find their way to the user, whether desirable or not.

SUMMARY

The illustrative embodiments provide a method, system, and computer program product. An embodiment forecasts, using a processor and a memory to execute a forecasting model, a forecasted timeline of future activities. The embodiment analyzes, using a constraints analysis model, a set of profile inputs to determine a context of a first period in the forecasted timeline. The embodiment analyzes, using a context extraction model, a first notification from a set of notifications, the analyzing determining a context of the first notification. The embodiment computes a degree of correspondence between the context of the first period and the context of the first notification. The embodiment schedules, responsive to the degree of correspondence being at least a threshold degree of correspondence, the first notification for presentation during the first period regardless of a time of arrival of the first notification.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that even if a notification pertains to a subject of interest of a user, the notification may not be useful to the user at a given time, place, or manner of delivery. The illustrative embodiments recognize that while notifications can be presently created according to the perceived subjects of interest of a user, their delivery to the user is not always timed suitably for maximizing the utility of the information contained in the notification, optimizing the user's investment of time and effort in consuming the notification, or both.

As far as the timing of the notifications is concerned, presently, some advertising can be timed for delivery by detecting the user's presence near the advertised product. However, the illustrative embodiments recognize that a user's interest in a particular subject, item, goods or services, is not a fixed entity, and is dependent on a variety of factors that influence that interest. For example, even if an advertisement for a can of soup can be delivered to a user's mobile device when the user is in the soup aisle at a supermarket, it is not necessary that the user—who does like soup—wants to buy soup during that visit, on that day, or at that store. As another example, even if a user is engaged in five different projects at work, and emails pertaining to those five projects are all selected and delivered according to the user's perceived interest in those five projects, it is not necessary that the user is interested in a particular project from those five projects at the time the email is delivered, at the place where the user is situated at the time of email delivery, the application through which the email is delivered at the time, and many other factors.

The present state of the technological field of endeavor of electronic notifications delivery presently does not include intelligence apparatus to modify the timeline of the delivery of the notifications based on the context of the notification and how that context fits in the circumstances of the user in a forecasted timeline of the user's activities. A need exists for user-specific modification of the timeline of the delivery of the notifications to a user based on the context of the notification and a fitting of that context in a forecasted timeline of the user's activities. A need exists that a forecasting model be trainable using machine learning techniques to improve the timeline fitting of notifications and to adapt the model to the changing circumstances of the user by accommodating new characteristics of the user and diminishing the influence of old characteristics of the user.

The illustrative embodiments recognize that the presently available tools or solutions do not address these needs/problems or provide adequate solutions for these needs/problems. The illustrative embodiments used to describe the invention generally address and solve the above-described problems and other related problems by intelligent contextual timelining of notifications.

An existing electronic notification delivery system can be an apparatus, a tool, platform, or a mechanism, where any such manifestation employs a combination of computing hardware and software. An implementation of an embodiment, or one or more components thereof, can be configured as a modification of an existing electronic notification delivery system, with a companion software application executing in some combination of (i) the notification delivery system, (ii) a data processing system communicating with the notification delivery system over short-range radio or a local area network (LAN), and (iii) a data processing system communicating with the notification delivery system over a wide area network (WAN).

Certain operations are described as occurring at a certain component or location in an embodiment. Such locality of operations is not intended to be limiting on the illustrative embodiments. Any operation described herein as occurring at or performed by a particular component, e.g., a natural language processing (NLP) analysis, can be implemented in such a manner that one component-specific function causes an operation to occur or be performed at another component, e.g., at a local or remote NLP engine.

An embodiment monitors incoming notifications from a variety of notification sources, on a variety of channels that have been previously configured for a user. For example, a website may be a notification source, which uses a webpage as a channel to delivery notifications. As another example, an email server may be a notification source which uses an email mailbox as a channel.

Another embodiment monitors a variety of profile sources configured for the user. A profile source is an electronic data source from which information usable to determine a characteristic of the user can be obtained. For example, a profile source may be user's preferences configuration on a computing device, a calendar application where the user's future events are planned and past events are recorded, or a shopping related application where the user records and tracks shopping needs, preferences, quantities, and the like. A profile source can be a device, apparatus, or a platform that provides information from which a characteristic of the user can be derived. For example, a social media platform can operate as a profile source within the scope of the illustrative embodiments because a user's own or the user's social network's comments data can be analyzed to derive a preference, liking, sentiment, or usage towards subjects of interest to the user. A user's profile data, characteristic, and preference, are terms that are used herein interchangeably to indicate a constraint of a user that affects the delivery of a notification.

A constraint can be directly indicated in the information of a profile source. For example, a user may have an expressly stated preference for notifications pertaining to project X over project Y during a specified period, or the user may have an expressly stated preference for notifications pertaining to brand X over brand Y during a specified period or until further modification of the preference.

A constraint can be derived from the information collected from a profile source. For example, an embodiment can be configured to analyze a comment by a member of the user's social network towards project X to determine a period during which the user would prefer notifications pertaining to project X. As another example, the embodiment can be configured to derive a degree of urgency associated with the delivery of notifications pertaining to project X based on analyzing a comment noted on a calendar entry of a future meeting. Preferences, consumption, timing, and utility of items, goods, and services, and notifications pertaining thereto, can be computed by an embodiment in a similar manner.

A constraint as determined by an embodiment is variable over time. E.g., the user may prefer notifications of project X to notifications of project Y this week during the period from 8 AM till 10 AM, but that preference can change next week when project Y becomes a priority. In that case, the user may prefer to prioritize the notifications pertaining to project Y over the notifications pertaining to project X during 8 AM till 2 PM.

Similarly, the superstore visit planned this evening may not include soup even though the user likes soup and notifications concerning soup might be irrelevant even if the user finds himself in the soup aisle this evening. However, an embodiment may derive a constraint that soup will need to be replenished according to an inventory system (an example of a profile system). Then, a soup related notification might be more relevant when the user plans the next visit to the superstore might. Furthermore, if there are competing notifications from different stores (notification sources) and one notification benefits the user more than the other, an embodiment can prioritize the competing notifications according to this and other secondary considerations as a part of rearranging the soup related notifications in a forecasted timeline of the next store visit, and might even guide the user to plan the visit at the more beneficial of the two stores.

Operating with profile information from one or more profile sources, an embodiment routinely evaluates the constraints that are applicable to the user's forecasted timeline. The embodiment adds new constraints when found in profile information analysis, modifies existing constraints when justified by the profile information analysis, and diminishes the use of past constraints depending on the observed usage of the constraint and/or presence of support for the past constraint in the profile information. A past constraint can be diminished or aged by deprioritizing the constraint by some degree, including removal/deletion/or rendering ineffective the past constraint. The addition, modification, and diminishing of constraints in an event-drive manner, periodically, or from time-to-time, is referred to herein as constraints aging.

Operating with profile information from one or more profile sources, an embodiment forecasts user's activity during future periods of time. For example, based on calendaring data, the embodiment may determine, e.g., by NLP of the calendar entries, that the user plans to work on project X tomorrow between 8 AM and Noon, project Y from 1 PM till 3 PM, and has personal time off after 3 PM. The embodiment derives a context that is applicable to an activity during a forecasted period. More than one context may be applicable to a period. For example, project X is a context during 8 AM to Noon tomorrow, generally, all active projects are a context during that period with project X being a higher priority context than others, and shopping is not a context that is applicable from 8 Am to Noon tomorrow. However, shopping is a context after 3 PM tomorrow but the active projects are not.

Operating in this manner, an embodiment forecasts the user's future timeline for tomorrow and populates the timeline with contexts that are applicable during various forecasted periods. The embodiment similarly determines the contexts, e.g., by NLP, of notifications received from notification sources and pending delivery to the user. Regardless of the order of arrival of the notifications at the embodiment, the embodiment rearranges the notifications by matching a context of a notification with a forecasted period where the embodiment finds a corresponding context of the user's activities. For example, even if a soup advertisement arrives before a project X notification, during 8 AM till Noon tomorrow, the project X notification is prioritized for delivery, and the soup advertisement may be delivered after a delay or not delivered at all until after 3 PM that day. Conversely, if a soup advertisement arrives after a project X notification, after 3 PM tomorrow, the soup advertisement is prioritized for delivery, and the project notification may be delivered after a delay or not delivered at all until a context of projects (or specifically project X) is found again in the user's forecasted timeline.

These examples of constraints, timelining, secondary considerations, rearranging, benefits, and constraints aging are not intended to be limiting. From this disclosure, those of ordinary skill in the art will be able to conceive many other aspects applicable towards a similar purpose, and the same are contemplated within the scope of the illustrative embodiments.

The manner of intelligent contextual timelining of notifications described herein is unavailable in the presently available methods in the technological field of endeavor pertaining to electronic notification delivery. A method of an embodiment described herein, when implemented to execute on a device or data processing system, comprises substantial advancement of the functionality of that device or data processing system in electronic notification delivery by contextually rearranging the notifications for delivery in a forecasted timeline using constraints aging.

The illustrative embodiments are described with respect to certain types of data, functions, algorithms, equations, model configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
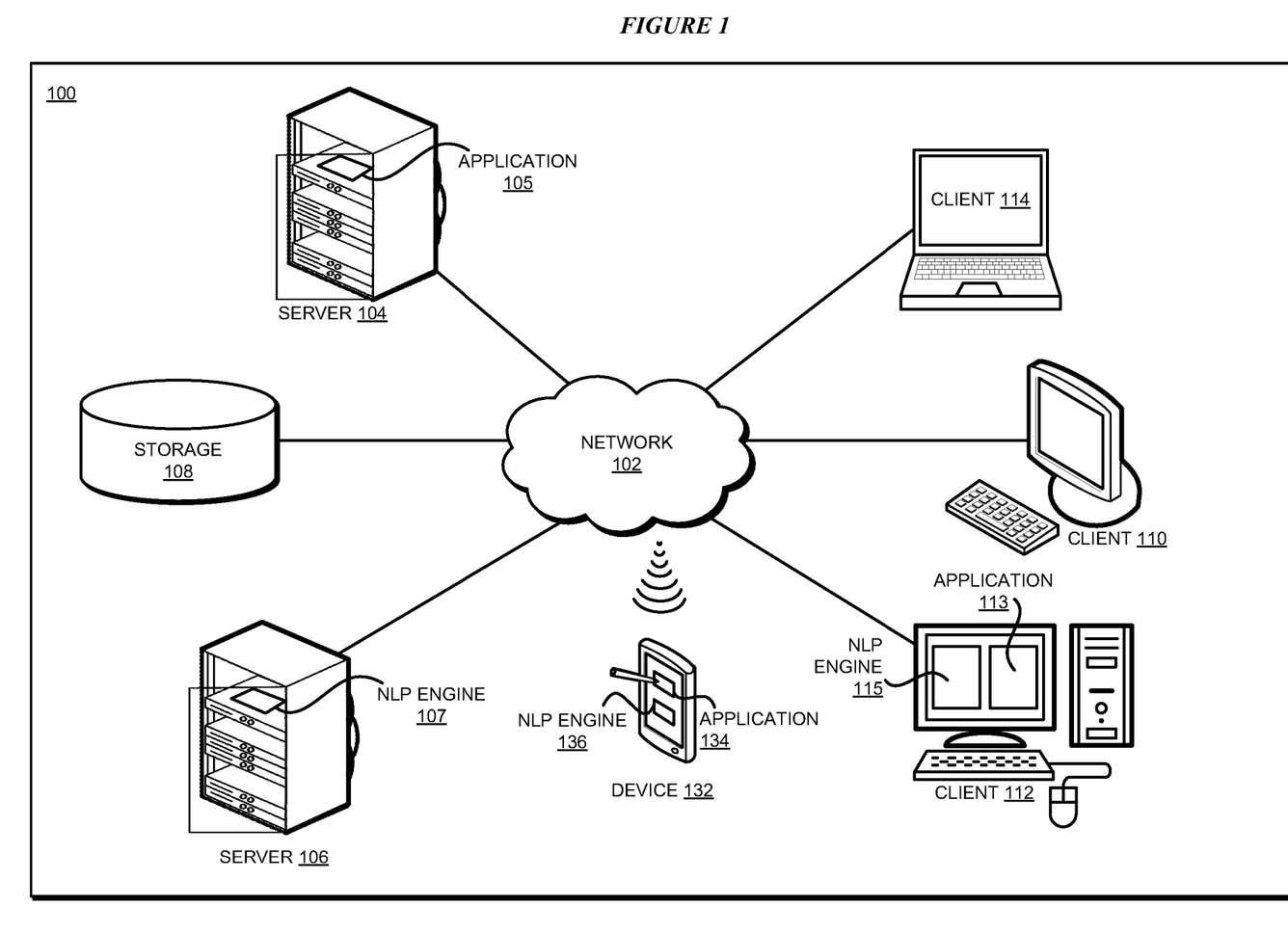
FIG. 1 depicts a block diagram of a network of data processing systems in which illustrative embodiments may be implemented.
Figure 2:
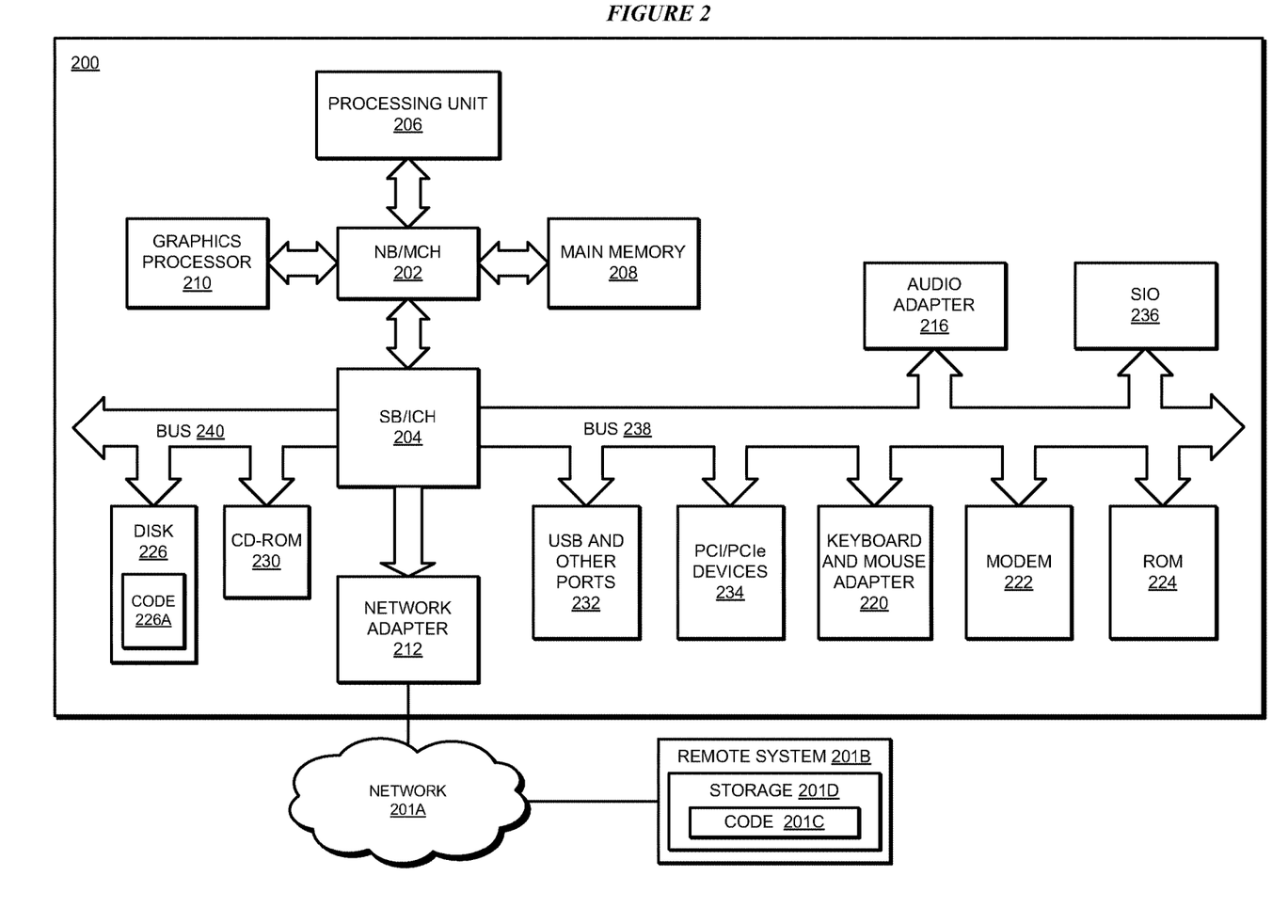
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment.

For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

When an embodiment is configured for server-side notification delivery management, application 105 implements an embodiment as described herein. Application 105 can be configured to utilize NLP engine 107 as described herein. Database 109 can be local or remote to application 105 for storing a set of constraints. When an embodiment is configured for client-side notification delivery management, application 113 or 134 implements an embodiment as described herein. Application 113 or 134 can be configured to utilize remote NLP engine 107, or local NLP engines 115 or 136, respectively. Database 109 can be local or remote to application 1113 or 134 for storing the set of constraints.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105, 113, and 134, in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
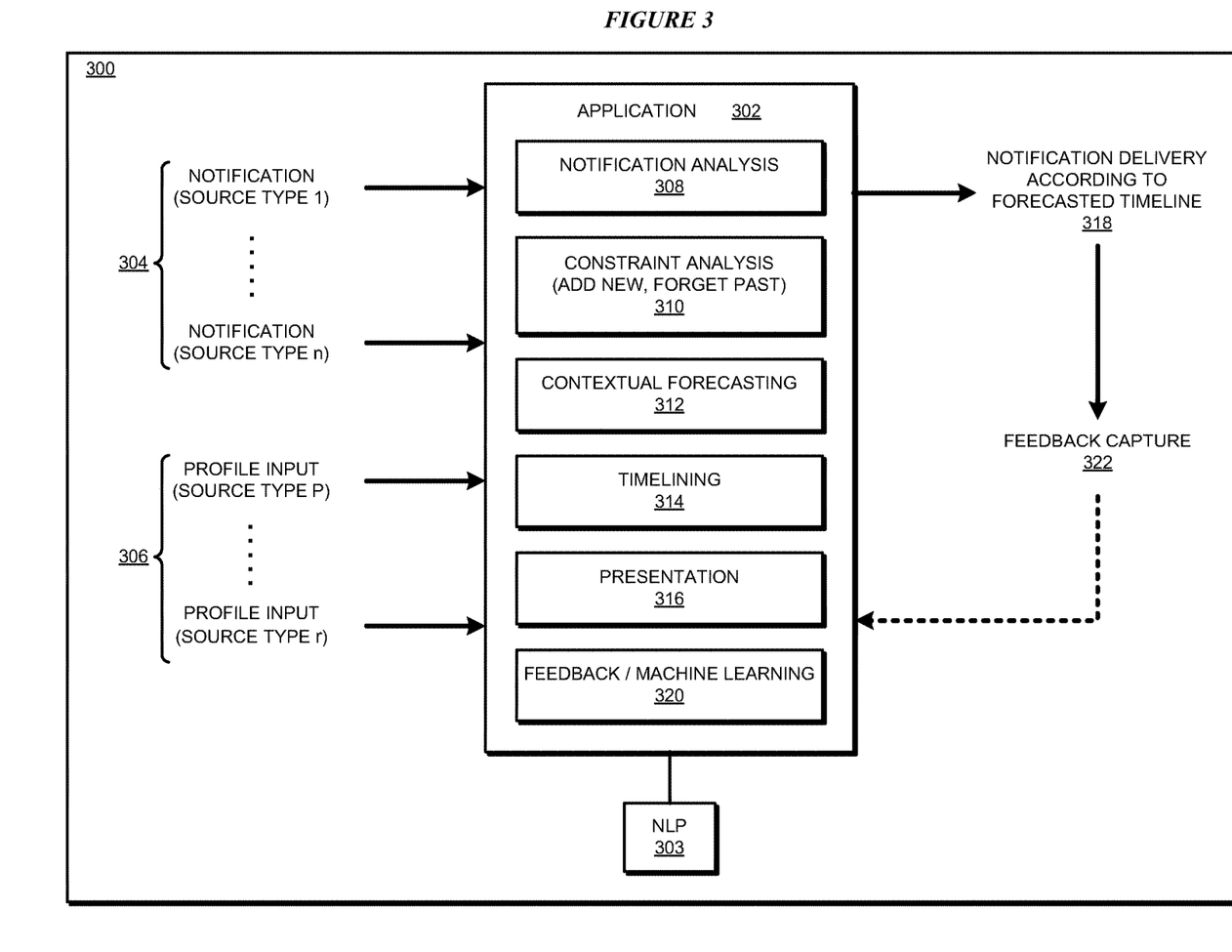
FIG. 3 depicts a block diagram of an example configuration for intelligent contextual timelining of notifications in accordance with an illustrative embodiment.

With reference to FIG. 3, this figure depicts a block diagram of an example configuration for intelligent contextual timelining of notifications in accordance with an illustrative embodiment. Application 302 is an example of any of applications 105, 113, or 134 in FIG. 1, depending upon the particular implementation.

Application 302 receives notification information 304 in the form of an input from one or more notification sources. Multiple notifications from a single notification source, different notifications from different notification sources, different notifications on different channels, same notification or same notification source on different channels, are some of the possible combinations in input 304.

Application 302 receives profile information 306 in the form of another input from one or more profile sources. Multiple profile information from a single profile source, different profile information from different profile sources, different profile information on different channels, same profile information or same profile source on different channels, are some of the possible combinations in input 306.

Component 308 analyzes a notification from input 304, e.g., using NLP engine 303—which corresponds to one of NLP engines 107 or 115 or 136 in FIG. 1—to extract a context to which the notification applies. Component 308 also extracts other aspects of the notification through this analysis, using existing NLP techniques. For example, this analysis might perform a comparative analysis of a characteristic of two or more notifications. An example described earlier determined whether one notification contained information more beneficial than the information of another notification in terms of which source sent the notification.

Component 310 uses input 306 to perform constraints analysis, e.g., using NLP and other suitable techniques. For example, profile information received from a social media feed might have to be subjected to sentiment analysis for an embodiment to determine a forecasted liking for a widget which forms a derived constraint, but a calendar entry may include self-evident information about the subject of a meeting in a future period which provides a direct constraint for that future period. As a part of constraints analysis, component 310 also performs constraints aging in a manner described herein.

Component 312 uses input 306 to forecast contexts that are going to be relevant to the user in one or more future periods. Again, some features for the forecasting are derived from processing, such as NLP of certain types of profile inputs, and some features for the forecasting are obtained/obtainable directly from parsing certain other types of profile inputs. Examples and circumstances of each kind are described herein.

Given a timeline forecast, given the contexts applicable to various forecasted periods, and given the contexts and characteristics of the various notifications awaiting delivery, component 314 performs a timelining operation. As a part of the timelining operation, component 314 rearranges the delivery order of the notifications regardless of their times of arrival at application 302, but with regard to their context and characteristics corresponding to a context of a forecasted period as described herein. Furthermore, as a part of the timelining operation, component 314 may restrict a notification from delivery, delay the delivery of a notification to a period which most corresponds to the context of the notification, delay the delivery of a notification to a period which is open to context-free notification delivery, and/or omit the delivery of a duplicative notification if another notification whose context and characteristics match with those of the duplicative notification within a specified tolerance when the original and the duplicative notifications are received within a specified time gap of one another.

Component 316 presents a timelined notification during the period in which the notification is arranged to be presented by component 314. In one embodiment, component 316 presents the notification on a mobile device, a wearable device, an augmented reality (AR) device, or some combination thereof. In another embodiment, component 316 presents the notification on a device that is closest to the user at the user's location.

In another embodiment, component 316 presents the notification on a device, application, or platform that is selected according to the user's preference during the forecasted period. In another embodiment, component 316 determines the user's preference for devices, applications, or platforms using which to present the notifications during a forecasted period by configuring constraint analysis component 310 to use profile inputs and historical information of the user. For example, the user may not want notifications to be presented on a social media platform, when the user is forecasted to be in a business meeting and a past usage indicates that the user checks text messages but not social media platforms during a meeting. Accordingly, even though the notification source sent the notification to the social media platform, an embodiment may redirect the notification to a different channel in addition to rearranging a time of presentation of the notification.

In another embodiment, component 316 adapts the notification for presentation on a selected channel. For example, a multimedia notification sent to a social media channel by the notification source may be unfit for delivery on SMS channel. Accordingly, component 316 transforms the notification to a text only message for delivery to the changed channel. Performing one or more operations described herein, component 316 presents notification 318 on a selected channel, in a form corresponding to the channel, and according to a contextual mapping of the notification to a period in a forecasted timeline.

Component 320 optionally collects user feedback 322 relative to the presentation of notification 318. In one embodiment, application 302 is configured to present not only notification 318 but also a method for the user to input a feedback, where the feedback is indicative of an accuracy of (i) the forecasted timeline, (ii) the arranging of the notification in the forecasted timeline, (iii) the selection of the delivery channel, (iv) the alteration of the content of the notification according to the channel, (v) comparative selection of notifications from competing or substantially duplicative notifications, (iv) or some combination of (i)-(v). Component 320 applies the feedback in a machine learning technique to modify the forecasting model used in component 312, the analysis model used in component 308, the analysis model used in component 310, or some combination thereof.

Figure 4:
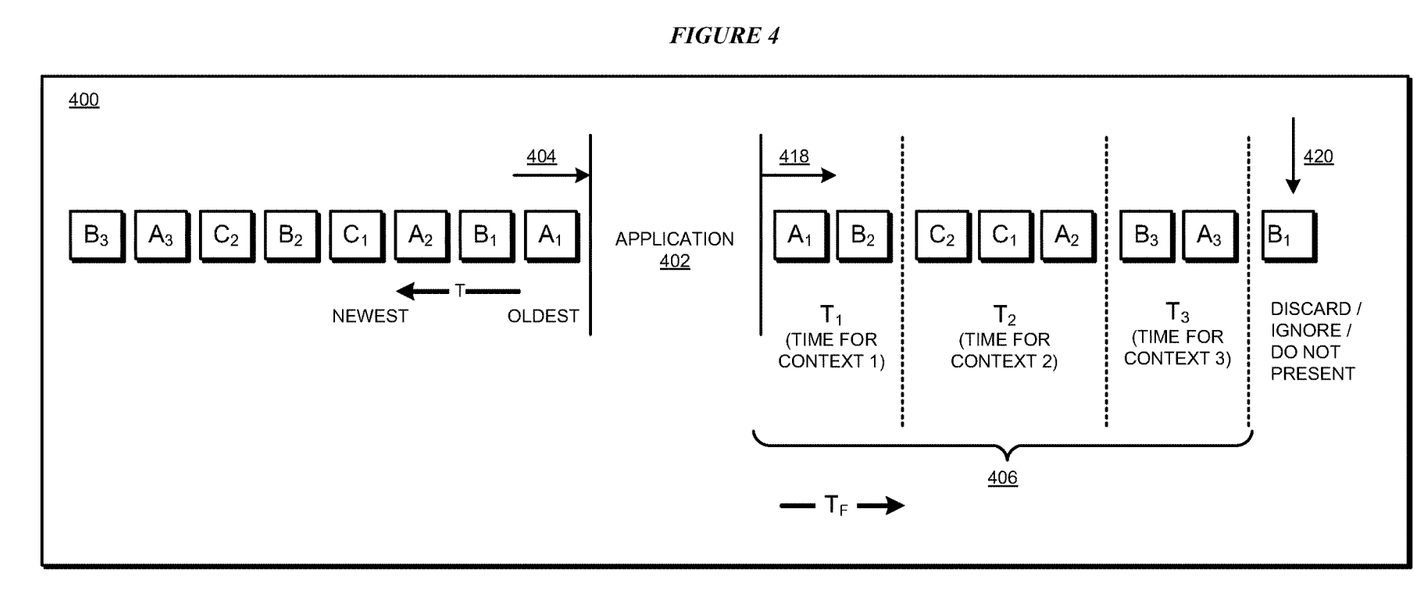
FIG. 4 depicts an example timelining of notifications in accordance with an illustrative embodiment.

With reference to FIG. 4, this figure depicts an example timelining of notifications in accordance with an illustrative embodiment. Application 402 is an example of application 302 in FIG. 3.

A simplified non-limiting example operation of application 402 is depicted and described with respect to FIG. 4. Application 402 receives notifications input 404. Suppose that notification source A supplies notifications A1, A2, and A3, notification source B supplies notifications B1, B2, and B3, and notification source C supplies notifications C1 and C2 in input 404 in the chronological order T as shown.

Application 402 by performing one or more operations described herein, forecasts timeline 406 (TF), which includes future periods T1, T2, and T3 in the direction shown for TF. Application 402 determines that context 1 is applicable in period T1, context 2 is applicable in period T2, and context 3 is applicable in period T3.

Suppose only for the purposes of the clarity of the description that any channel selection, notification transformation, and other operations are ignored in this example. Application 402 timelines notification 404 in the form of timelined notifications 418. Particularly, application 402 orders notification A1 followed by B2 for period T1, C2, followed by C1, followed by A2 in period T2, and B3 followed by A3 in period T3. Application 402 does not present subset 420 of notification, which includes notification B1, for one or more reasons described herein.

Figure 5:
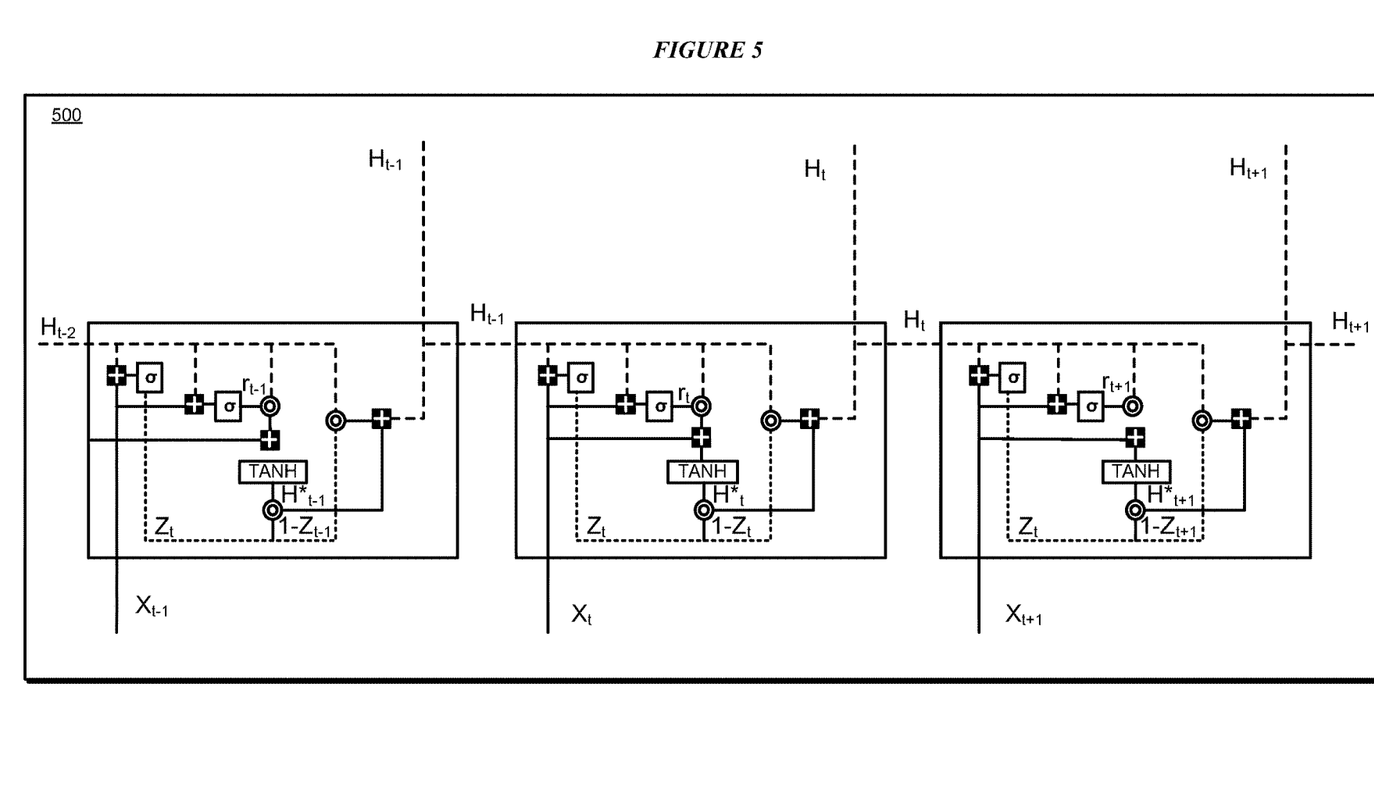
FIG. 5 depicts one example configuration for implementing constraint analysis and aging component in accordance with an illustrative embodiment.

With reference to FIG. 5, this figure depicts one example configuration for implementing constraint analysis and aging component in accordance with an illustrative embodiment. Configuration 500 can be implemented in component 310 of application 302 in FIG. 3.

Suppose, as some non-limiting examples relevant to an advertising use case, that the profile information includes—user's profile including historical spending pattern, buying plans including historical shopping plan or service usage plan (e.g., travel plans, etc.), purchase cycle information. The profile information either includes or is usable to derive additional profile information such as predicted consequences of having or not having the product or service (e.g., the user's historical product or service change affinity pattern), price fluctuations, change in quality with time, recommendations and influences in social media, etc. the profile information also includes expressed or projected needs of the user, including the preferred/needed values of the various product attributes, number of members to whom the profile applies (e.g., the user may be representing a group of users), calendar events, ability to consume a subject good or service, and many others. Other profile information useful in computing the constraints in this use-case can include social network feedback about the context, promotional offers, storage capability for the goods in question, rate of consumption of the goods in question, user's purchase cycle for those goods, inventory cost, and many others.

A recurrent neural network (RNN) comprising a plurality of Gated Recurrent Units (GRUs) is depicted in configuration 500. An RNN is a type of artificial neural network designed to recognize patterns in sequences of data, such as text, genomes, handwriting, the spoken word, or numerical times series data emanating from sensors, stock markets and government agencies. RNNs use recurrent connections (going in the opposite direction that the "normal" signal flow) which form cycles in the network's topology. Computations derived from earlier input are fed back into the network, which gives an RNN something similar to a short-term memory. Feedback networks, such as RNNs, are dynamic; their 'state' is changing continuously until they reach an equilibrium point. For this reason, RNNs are particularly suited for detecting relationships across time in a given set of data. NLP and time-series forecasting are some fields of endeavor where RNNs are commonly used.

Recurrent networks take as their input not just the current input example they see, but also what they have perceived previously in time. The decision a recurrent net reached at time step t−1 affects the decision it will reach one moment later at time step t. Thus, recurrent networks have two sources of input, the present and the recent past, which combine to determine how they respond to new data.

In the example configuration 500, a GRU module triggers the optimal period in a forecasted timeline where a contextually relevant notification based on one or more constraints computed from the profile information should be presented for optimal utility to the user. Using the weighted configuration of all or a subset of the example profile information for this use-case, the RNN outputs a weighted configuration of the profile information components to calculate the maxima of quantities, consumption, purchase and storage periods as constraints that would be applicable to the notifications. The GRU module also determines those notifications which do not sufficiently correspond (within a threshold correspondence) to a context applicable during a forecasted period and can be ignored.

The system of FIG. 5 starts with prioritizing the time triggering activation and prioritization of the module. An embodiment enables the system with calculating the update gate z_t for time step t using:

$$z_t = \sigma(W^{(z)} x_t + U^{(z)} h_{t-1})$$

When x_t is plugged into the network unit, it is multiplied by its own weight W(z). The same goes for h_(t−1) which holds the information for the previous t−1 units and is multiplied by its own weight U(z). Both results are added together, and a sigmoid activation function is applied to squash the result between 0 and 1. Essentially, this gate is used from the model to decide how much of the past information to forget. To calculate it, the configuration uses:

$$r_t = \sigma(W^{(r)} x_t + U^{(r)} h_{t-1})$$

Multiply the input x_t with a weight W and h_(t−1) with a weight U. Calculate the Hadamard (element-wise) product between the reset gate r_t and Uh_(t−1). That will determine what to remove from the previous time steps. Apply the nonlinear activation function tanh. Accordingly, said system will be identifying appropriate timing for utilizing the received content/notification so that, user is benefitted from the various notifications and offers. For example, one time offer of Pizza is 50% off, if user purchase the Pizza by using the coupon on Wednesday then he can buy only one Pizza, but if he purchases the Pizza on Sunday, then he can purchase 10 Pizzas with 50% off, as Sunday he has to give a birthday party, so offer utilization timeline is also important. Or user may not like two-time pizza in a week, so Sunday is the better option.

The post processing system will determine how many of each message/offer to send to a user. A multidimensional feature space that includes buying power and scheduling information. An unbounded knapsack problem will maximum the overall value of goods as output by the GRU $$\Sigma_{i=1}^{n} v_i x_i$$

Subjected to $$\Sigma_{i=1}^{n} w_i x_i \leq W \text{ and } 0 \leq x_i$$

The resulting output of the feature vector determines how many of each message to send to a particular user. In this way, concurrent offers can be offered together as long as the product sum of weights for each message is less than the total weight a user can manager. The upper bound of W is determined by how often a user uses any number of offers within a period time. Effectively, this maps to modeling the user's Poisson distribution.

$$P(k \text{ events in interval}) = e^{-\lambda} \frac{\lambda^k}{k!}$$

Figure 6:
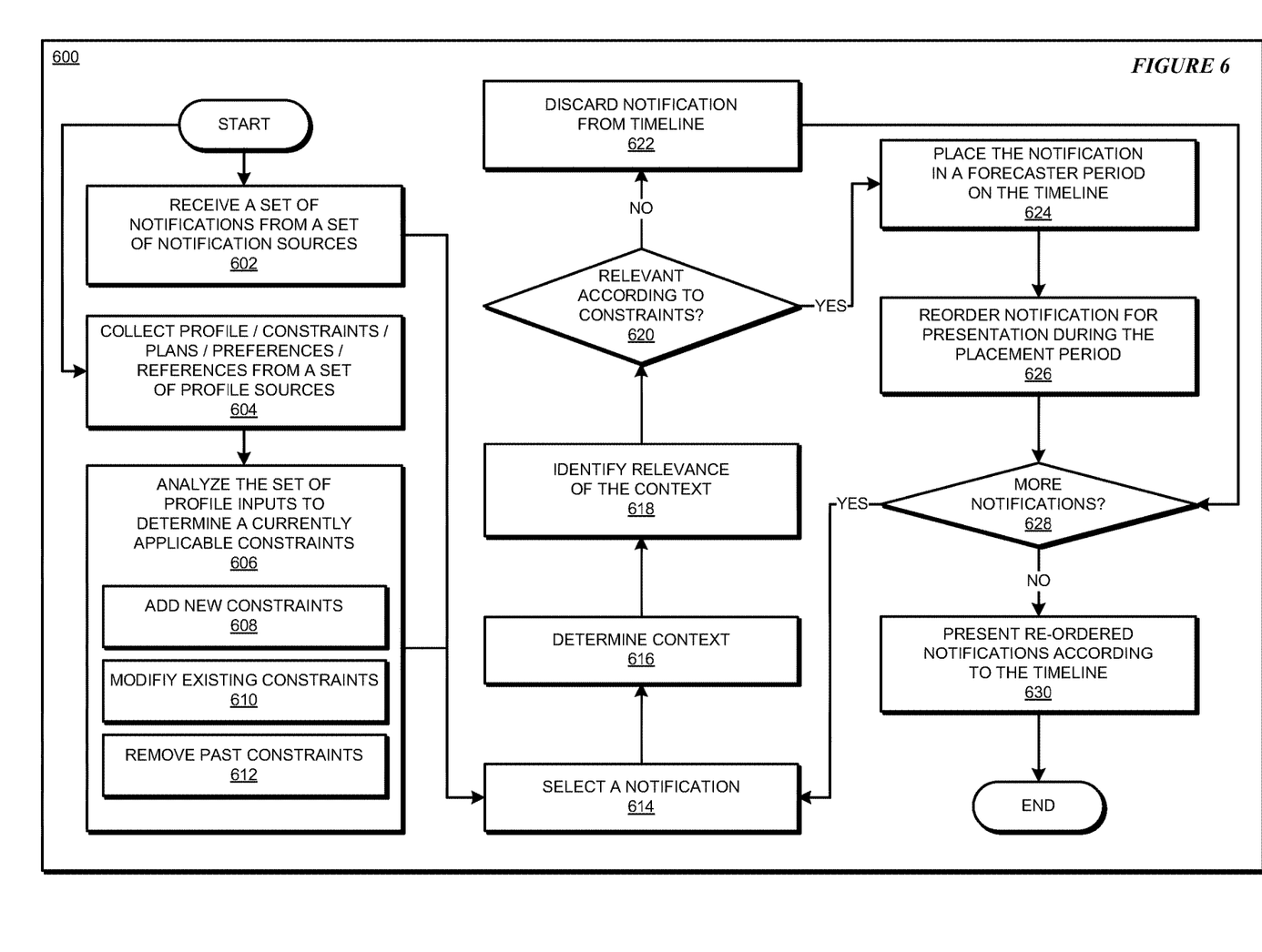
FIG. 6 depicts a flowchart of an example process for intelligent contextual timelining of notifications in accordance with an illustrative embodiment.

With reference to FIG. 6, this figure depicts a flowchart of an example process for intelligent contextual timelining of notifications in accordance with an illustrative embodiment. Process 600 can be implemented using application 302 in FIG. 3.

The application receives or monitors a set of notifications from a set of notification sources (block 602). In parallel with block 602, or asynchronously with block 602, the application collects or receives a set of profile inputs from a set of profile sources (block 604).

The application analyzes the set of profile inputs to determine a currently applicable constraints that will govern a forecasted timeline (block 606). For example, the application performs constraint aging by adding new constraints (sub-block 608), modifying existing constraints (sub-block 610), diminishing the effect of or removing past constraints (sub-block 612), or some combination thereof.

The application selects a notification from the set of notifications of block 602 (block 614). The application determines one or more contexts of the notification (block 616). The application identifies a relevance of the context, e.g., by determining whether there exists at least one period in the forecasted timeline where a corresponding or matching context is identified as relevant to the user (block 618). The application determines whether the context of the notification is relevant to a period in the timeline (block 620).

If the context of the notification is not relevant to a period in the timeline ("No" path of block 620), i.e., the context of the notification does not match or correspond to a context of a forecasted period by at least a threshold degree of context correspondence, the application discards the notification from the timeline, i.e., suppresses the delivery or presentation of the notification (block 622). The application progresses process 600 to block 628 thereafter.

If the context of the notification is relevant to a period in the timeline ("Yes" path of block 620), i.e., the context of the notification does match or correspond to a context of a forecasted period by at least a threshold degree of context correspondence, the application places the notification in a forecasted period in the timeline, i.e., schedules or arranges the delivery or presentation of the notification during that period in the future (block 624). The application reorders the notifications regardless of their time of arrival, for presentation during the period (bock 626).

The application determines whether there are more notifications awaiting analysis and scheduling in this manner (block 628). If more notifications are to be analyzed ("Yes" path of block 628), the application returns process 600 to block 614. If no more notifications are to be analyzed ("No" path of block 628), the application presents the reordered notifications according to their respective periods in the forecasted timeline (block 630). The application ends process 600 thereafter.

Figure 7:
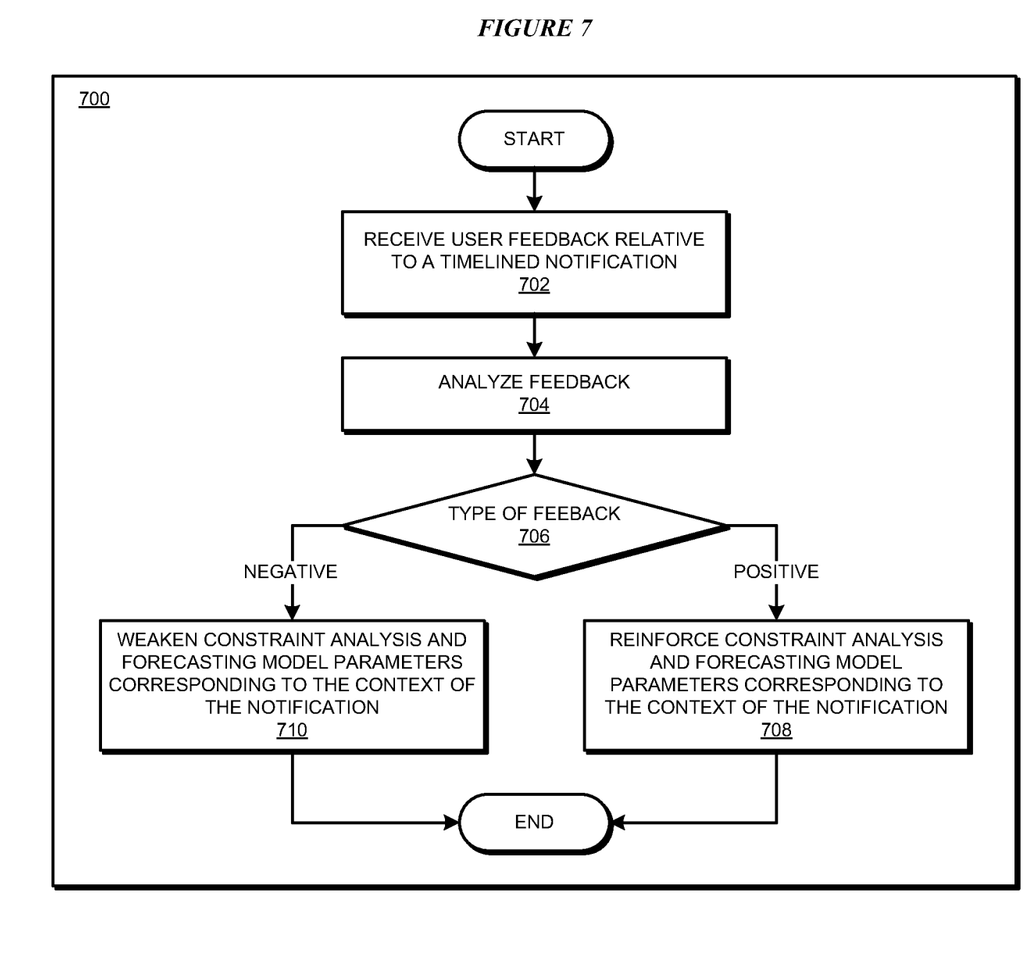
FIG. 7 depicts a flowchart of an example process for machine learning in intelligent contextual timelining of notifications in accordance with an illustrative embodiment.

With reference to FIG. 7, this figure depicts a flowchart of an example process for machine learning in intelligent contextual timelining of notifications in accordance with an illustrative embodiment. Process 700 can be implemented in application 302 of FIG. 3.

The application receives a user feedback input relative to a timelined notification (block 702). The application analyzes the feedback input (block 704). The application determines a type of the feedback (block 706). If the feedback affirms the accuracy of the timelining of the notification ("Positive" path of block 706), the application reinforces the constraint analysis model parameters, forecasting model parameters, or a combination thereof, that correspond to the context of the notification (block 708). If the feedback is unsatisfactory as to the accuracy of the timelining of the notification ("Negative" path of block 706), the application weakens the constraint analysis model parameters, forecasting model parameters, or a combination thereof, that correspond to the context of the notification (block 710). The application ends process 700 thereafter.

Thus, a computer implemented method, system or apparatus, and computer program product are provided in the illustrative embodiments for intelligent contextual timelining of notifications and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    forecasting, using a processor and a memory to execute a forecasting model, a forecasted timeline of future activities;
    analyzing, using a constraints analysis model, a set of profile inputs to determine a context of a first period in the forecasted timeline;
    analyzing, using a context extraction model, a first notification from a set of notifications, the analyzing determining a context of the first notification;
    computing a degree of correspondence between the context of the first period and the context of the first notification;
    scheduling, responsive to the degree of correspondence being at least a threshold degree of correspondence, the first notification for presentation during the first period regardless of a time of arrival of the first notification presenting the first notification during the first period;
    collecting user feedback about the first notification, the user feedback being indicative of an accuracy of a timelining of the first notification; and
    applying said user feedback to a machine learning model to modify a model selected from the group consisting of the forecasting model, the constraints analysis model and the context extraction model.

2. The method of claim 1, further comprising:
    determining a context of a second notification in the set of notifications, wherein the second notification arrives prior in time to the first notification; and
    scheduling, responsive to the context of the second notification corresponding to a context of a second period in the forecasted timeline, the second notification for presentation during the second period after the first notification has been presented.

3. The method of claim 1, further comprising:
    determining a context of a second notification in the set of notifications; and
    omitting scheduling, responsive to the context of the second notification corresponding to a context of a second period in the forecasted timeline by less than the threshold degree of correspondence, the second notification for presentation during the forecasted timeline.

4. The method of claim 1, further comprising:
    determining that a second channel is a preferred channel for presentation during the first period of the forecasted timeline, wherein the first notification is delivered in a first channel by a first notification system; and
    presenting the first notification using the second channel.

5. The method of claim 4, further comprising:
    modifying a content of the first notification to form a modified content, wherein the content is suitable for presentation using the first channel and the modified content is suitable for presentation using the second channel.

6. The method of claim 1, further comprising:
    omitting a third notification in the set of notifications from scheduling for presentation in the forecasted timeline responsive to a context of a third notification having at least the threshold degree of correspondence with the context of the first notification.

7. The method of claim 6, wherein a characteristic of the first notification has a greater utility in the forecasted timeline as compared to a utility of a corresponding characteristic of the third notification.

8. The method of claim 1, wherein the context extraction model operates in a Natural Language Processing (NLP) engine.

9. A computer usable program product comprising a computer-readable storage device, and program instructions stored on the storage device, the stored program instructions comprising:
    program instructions to forecast, using a processor and a memory to execute a forecasting model, a forecasted timeline of future activities;
    program instructions to analyze, using a constraints analysis model, a set of profile inputs to determine a context of a first period in the forecasted timeline;
    program instructions to analyze, using a context extraction model, a first notification from a set of notifications, the analyzing determining a context of the first notification;
    program instructions to compute a degree of correspondence between the context of the first period and the context of the first notification;

program instructions to schedule, responsive to the degree of correspondence being at least a threshold degree of correspondence, the first notification for presentation during the first period regardless of a time of arrival of the first notification program instructions to present the first notification during the first period;

program instructions to collect user feedback about the first notification, the user feedback being indicative of an accuracy of a timelining of the first notification; and program instructions to apply said user feedback to a machine learning model to modify a model selected from the group consisting of the forecasting model, the constraints analysis model and the context extraction model.

10. The computer usable program product of claim 9, further comprising:

program instructions to determine a context of a second notification in the set of notifications, wherein the second notification arrives prior in time to the first notification; and program instructions to schedule, responsive to the context of the second notification corresponding to a context of a second period in the forecasted timeline, the second notification for presentation during the second period after the first notification has been presented.

11. The computer usable program product of claim 9, further comprising:

program instructions to determine a context of a second notification in the set of notifications; and program instructions to omit scheduling, responsive to the context of the second notification corresponding to a context of a second period in the forecasted timeline by less than a threshold degree of correspondence, the second notification for presentation during the forecasted timeline.

12. The computer usable program product of claim 9, further comprising:

program instructions to determine that a second channel is a preferred channel for presentation during the first period of the forecasted timeline, wherein the first notification is delivered in a first channel by a first notification system; and program instructions to present the first notification using the second channel.

13. The computer usable program product of claim 12, further comprising:

program instructions to modify a content of the first notification to form a modified content, wherein the content is suitable for presentation using the first channel and the modified content is suitable for presentation using the second channel.

14. The computer usable program product of claim 9, further comprising:

program instructions to omit a third notification in the set of notifications from scheduling for presentation in the forecasted timeline responsive to a context of a third notification having at least a threshold degree of correspondence with the context of the first notification.

15. The computer usable program product of claim 14, wherein a characteristic of the first notification has a greater utility in the forecasted timeline as compared to a utility of a corresponding characteristic of the third notification.

16. The computer usable program product of claim 9, wherein the context extraction model operates in a Natural Language Processing (NLP) engine.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising a processor, a computer-readable memory, and a computer-readable storage device, and program instructions stored on the storage device for execution by the processor via the memory, the stored program instructions comprising:

program instructions to forecast, using the processor and the memory to execute a forecasting model, a forecasted timeline of future activities;

program instructions to analyze, using a constraints analysis model, a set of profile inputs to determine a context of a first period in the forecasted timeline;

program instructions to analyze, using a context extraction model, a first notification from a set of notifications, the analyzing determining a context of the first notification;

program instructions to compute a degree of correspondence between the context of the first period and the context of the first notification;

program instructions to schedule, responsive to the degree of correspondence being at least a threshold degree of correspondence, the first notification for presentation during the first period regardless of a time of arrival of the first notification program instructions to present the first notification during the first period;

program instructions to collect user feedback about the first notification, the user feedback being indicative of an accuracy of a timelining of the first notification; and program instructions to apply said user feedback to a machine learning model to modify a model selected from the group consisting of the forecasting model, the constraints analysis model and the context extraction model.

20. The computer system of claim 19, further comprising:

program instructions to determine a context of a second notification in the set of notifications, wherein the second notification arrives prior in time to the first notification; and program instructions to schedule, responsive to the context of the second notification corresponding to a context of a second period in the forecasted timeline, the second notification for presentation during the second period after the first notification has been presented.

* * * * *